(12) United States Patent  
Saito (10) Patent No.: US 9,046,686 B2  
(45) Date of Patent: Jun. 2, 2015

(54) HEAD-MOUNT TYPE DISPLAY DEVICE

(71) Applicant: SEIKO EPSON CORPORATION, Tokyo (JP)

(72) Inventor: Hitoshi Saito, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 246 days.

(21) Appl. No.: 13/852,360

(22) Filed: Mar. 28, 2013

(65) Prior Publication Data

US 2013/0257691 A1 Oct. 3, 2013

(30) Foreign Application Priority Data

Apr. 2, 2012 (JP) ................................. 2012-083634

(51) Int. Cl.
*G09G 5/00* (2006.01)
*G02B 27/01* (2006.01)

(52) U.S. Cl.
CPC ...... *G02B 27/017* (2013.01); *G02B 2027/0178* (2013.01); *G02B 2027/0118* (2013.01)

(58) Field of Classification Search
USPC .................. 345/7–9, 156–158; 359/629–631
See application file for complete search history.

(56) References Cited

U.S. PATENT DOCUMENTS

| 7,719,769 | B2 | 5/2010 | Sugihara et al. |
| 8,587,514 | B2* | 11/2013 | Lundstrom .................. 345/156 |
| 2005/0264527 | A1* | 12/2005 | Lin ................................ 345/156 |
| 2008/0218434 | A1* | 9/2008 | Kelly et al. ......................... 345/8 |
| 2009/0213037 | A1* | 8/2009 | Schon ................................. 345/7 |
| 2009/0231687 | A1* | 9/2009 | Yamamoto .................... 359/359 |
| 2011/0235185 | A1* | 9/2011 | Kanamori ..................... 359/630 |
| 2012/0033195 | A1* | 2/2012 | Tai ................................ 356/4.01 |
| 2012/0139816 | A1* | 6/2012 | King et al. ......................... 345/7 |
| 2012/0188148 | A1* | 7/2012 | DeJong ............................. 345/8 |
| 2012/0249587 | A1* | 10/2012 | Anderson et al. ............. 345/633 |
| 2013/0076787 | A1* | 3/2013 | Mathieu et al. ................ 345/633 |

FOREIGN PATENT DOCUMENTS

JP      A-2006-003879      1/2006

* cited by examiner

*Primary Examiner* — Kimnhung Nguyen
(74) *Attorney, Agent, or Firm* — Oliff PLC (57) ABSTRACT

A head-mount type display device adapted to allow a user to visually recognize a virtual image in a state of being worn on the head of the user includes an image display section having an image light generation section adapted to generate an image light representing an image, a light blocking section adapted to transmit external light at a predetermined transmittance, and a virtual image forming section adapted to transmit the external light transmitted through the light blocking section and to form the virtual image in an eye of the user with the image light, and configured to allow the user to visually recognize the virtual image and an external image, an operation section with which the user inputs operation data, and a control section adapted to perform control of changing the transmittance of the light blocking section in accordance with operation data from the operation section.

15 Claims, 9 Drawing Sheets

HEAD-MOUNT TYPE DISPLAY DEVICE

BACKGROUND

1. Technical Field

The present invention relates to a head-mount type display device for making the user visually recognize a virtual image in a state of being worn on the head of the user.

2. Related Art

In the past, there has been known a head-mount type display device for making the user visually recognize a virtual image in a state of being mounted on the head of the user. In such a head-mount type display device, there has been proposed a see-through head-mount type display device for superimposing the virtual image and the external image on each other (see, e.g., JP-A-2006-3879).

In the see-through head mounted display of the related art, there is a problem that the external image can always be seen behind the virtual image, and therefore the external image acts as an obstacle and it becomes difficult to visually recognize the virtual image in the case of operating an object in the virtual image or gazing at a character and a graphics in the virtual image.

SUMMARY

An advantage of some aspects of the invention is to provide a head-mount type display device capable of making it easy to visually recognize the virtual image superimposed on the external image.

(1) An aspect of the invention is directed to a head-mount type display device adapted to allow a user to visually recognize a virtual image in a state of being worn on the head of the user including an image display section having an image light generation section adapted to generate an image light representing an image, a light blocking section adapted to transmit external light at a predetermined transmittance, and a virtual image forming section adapted to transmit the external light transmitted through the light blocking section and to form the virtual image in an eye of the user with the image light, and configured to allow the user to visually recognize the virtual image and an external image, an operation section with which the user inputs operation data, and a control section adapted to perform control of changing the transmittance of the light blocking section in accordance with operation data from the operation section.

According to this aspect of the invention, by performing the control of changing the transmittance of the light blocking section for transmitting the external light (the external light representing the external image) at a predetermined transmittance based on the operation data from the operation section, it becomes possible to make the virtual image to be superimposed on the external image easy to be visually recognized by performing an operation for dropping the transmittance of the light blocking section, or to make the external image easy to be visually recognized by performing the operation for raising the transmittance of the light blocking section.

(2) Another aspect of the invention is directed to a head-mount type display device adapted to allow a user to visually recognize a virtual image in a state of being worn on the head of the user including an image display section having an image light generation section adapted to generate an image light representing an image, a light blocking section adapted to transmit external light at a predetermined transmittance, and a virtual image forming section adapted to transmit the external light transmitted through the light blocking section and to form the virtual image in an eye of the user with the image light, and configured to allow the user to visually recognize the virtual image and an external image, a detection section provided to the image display section, and adapted to detect a movement of the head of the user, and a control section adapted to perform control of changing the transmittance of the light blocking section in accordance with detection data detected by the detection section.

According to this aspect of the invention, by performing the control of changing the transmittance of the light blocking section for transmitting the external light at a predetermined transmittance based on the detection data detected by the detection section, it becomes possible to make the virtual image to be superimposed on the external image easy to be visually recognized by dropping the transmittance of the light blocking section in accordance with the detection data, or to make the external image easy to be visually recognized by raising the transmittance of the light blocking section in accordance with the detection data.

(3) The head-mount type display device according to the above aspect of the invention may be configured such that the control section controls the transmittance of a first region of the light blocking section and the transmittance of a region other than the first region independently from each other.

According to this configuration, by controlling the transmittance of the first region of the light blocking section and the transmittance of the region other than the first region independently from each other, it becomes possible to make the virtual image partially easy to be visually recognized, and to make the external image partially easy to be visually recognized.

(4) The head-mount type display device according to the above aspect of the invention may be configured such that the control section performs control of changing at least one of a size and a position of the first region.

According to this configuration, it becomes possible to change the part where the virtual image is made easy to be visually recognized and the part where the external image is made easy to be visually recognized.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, a preferred embodiment of the invention will be described in detail with reference to the accompanying drawings. It should be noted that the embodiment described below does not unreasonably limit the contents of the invention as set forth in the appended claims. Further, all of the constituents described below are not necessarily essential elements of the invention.

Figure 1:
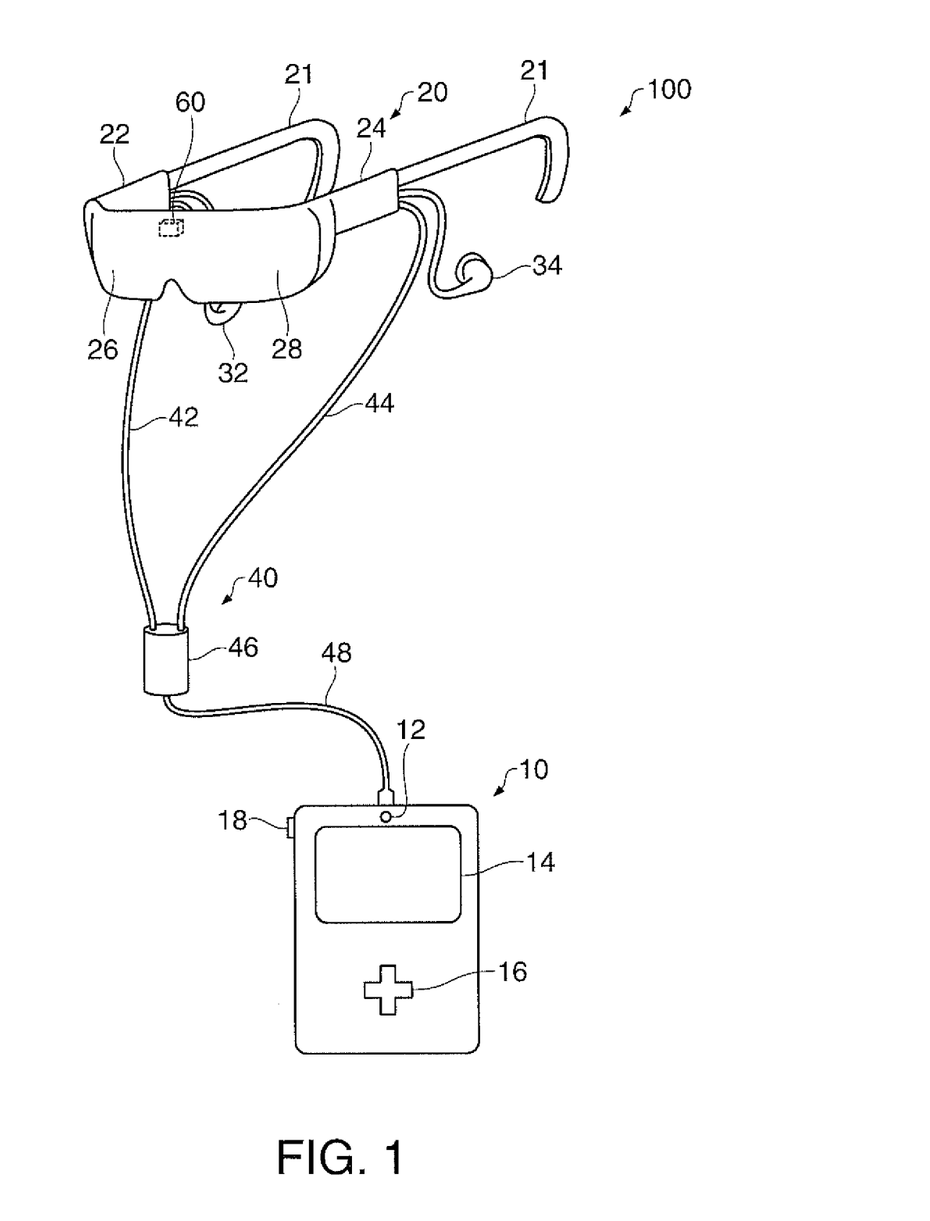
FIG. 1 is an appearance diagram showing an example of a configuration of a head-mount type display device according to an embodiment of the invention.

FIG. 1 is an appearance diagram showing an example of a configuration of a head-mount type display device according to the present embodiment.

The head-mount type display device 100 is a display device to be mounted on the head, and is also called a head-mounted display (HMD). The head-mount type display device 100 according to the present embodiment is an optical transmission type (so called see-through type) head-mount type display device with which the virtual image is visually recognized, and at the same time the external sight (the external image) can directly be recognized visually.

The head-mount type display device 100 is provided with an image display section 20 for making the user visually recognize the virtual image in the state of being mounted on the head of the user, and a control section 10 for controlling the image display section 20.

The image display section 20 is a mounting body to be mounted on the head of the user, and has a shape of a pair of spectacles in the present embodiment. The image display section 20 includes ear hook sections 21, a right display drive section 22, a left display drive section 24, a right optical image display section 26, and a left optical image display section 28. Further, the image display section 20 is provided with a detection section 60 (a sensor) for detecting a motion (an impact and a displacement) of the head of the user. The ear hook sections 21 are members disposed at the end portions of the right display drive section 22 and the left display drive section 24 so as to traverse above the ears, and function as temples (temples of the pair of spectacles). The right optical image display section 26 and the left optical image display section 28 are disposed so as to be located respectively in front of the right and left eyes of the user in the condition in which the user wears the image display section 20. The right display drive section 22 is disposed at a connection place where the ear hook section 21 for the right ear and the right optical image display section 26 are connected to each other. Further, the left display drive section 24 is disposed at a connection place where the ear hook section 21 for the left ear and the left optical image display section 28 are connected to each other. It should be noted that hereinafter the right display drive section 22 and the left display drive section 24 are collectively referred to simply as a "display drive section," and the right optical image display section 26 and the left optical image display section 28 are collectively referred to simply as an "optical image display section."

The display drive section includes a drive circuit not shown, a liquid crystal display (LCD), a projection optical system, and so on. The optical image display section includes a light blocking section, a light guide plate, and a light control plate not shown. The light blocking section is formed of a liquid crystal shutter, disposed so as to cover at least a part of an obverse side (the side opposite to the side of the user eyes) of the image display section 20, and transmits the external light at a predetermined transmittance. By controlling the light transmittance of the light blocking section, it is possible to control the external light intensity entering the user eyes to thereby control how easily the virtual image is visually recognized. The light guide plate is formed from a light transmissive resin material or the like, and transmits the external light having transmitted through the light blocking section, and at the same time emits the image light having been taken from the display drive section toward the eyes of the user.

The image display section 20 is further provided with a right earphone 32 for the right ear and a left earphone 34 for the left ear. The right earphone 32 and the left earphone 34 are mounted respectively to the right and left ears when the user wears the image display section 20.

The image display section 20 is further provided with a connection section 40 for connecting the image display section 20 to the control section 10. The connection section 40 includes a main body wire 48 to be connected to the control section 10, a right wire 42 and a left wire 44 branched from the main body wire 48, and a connecting member 46 disposed at the branch section. The right wire 42 is connected to the right display drive section 22, and the left wire 44 is connected to the left display drive section 24. The image display section 20 and the control section 10 perform transmission of various signals via the connection section 40. An end portion of the main body wire 48 on the side opposite to the connection member 46 and the control section 10 are provided with respective connectors (not shown) connected to each other, and the control section 10 and the image display section 20 can be connected to/separated from each other in accordance with engagement/disengagement of the connector of the main body wire 48 and the connector of the control section 10. As the main body wire 48, the right wire 42, and the left wire 44, a metal cable or an optical fiber can be adopted.

The control section 10 is a device for supplying the head-mount type display device 100 with power to control the image display section 20. The control section 10 includes a lighting section 12, a touch pad 14, arrow keys 16, and a power switch 18. The lighting section 12 gives notice of the operating state (e.g., ON/OFF state of the power) of the image display section 20 using a light emitting state thereof. As the lighting section 12, a light source such as an LED can be used. The touch pad 14 detects the finger operation of the user on the operation surface of the touch pad 14, and then outputs a signal (operation data) corresponding to the detection content. The arrow keys 16 detect the holding-down operation to the keys corresponding to up, down, right, and left directions, and then output a signal (operation data) corresponding to the detection content. The power switch 18 detects a sliding operation of the switch to thereby switch the powering state of the head-mount type display device 100.

Figure 2:
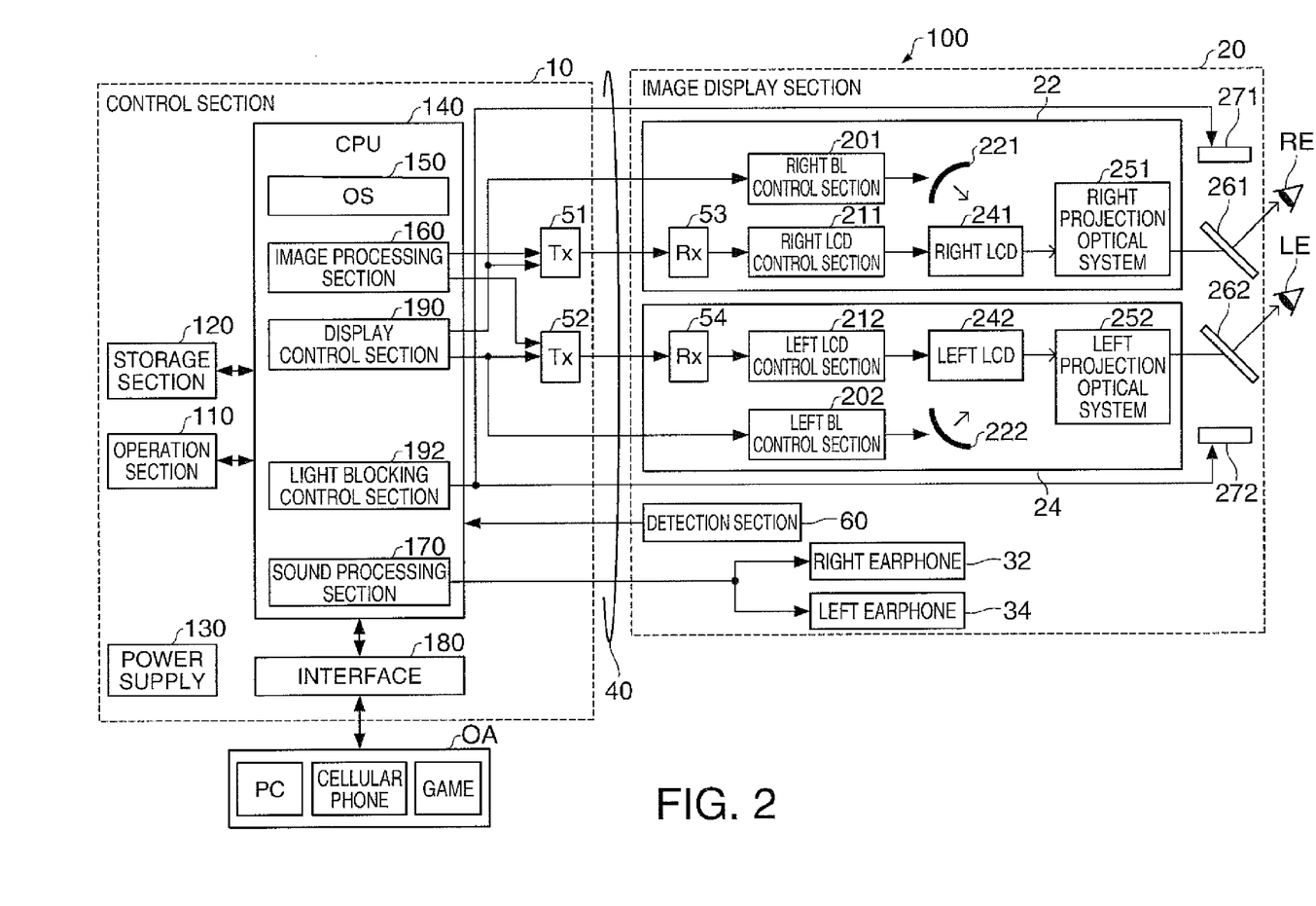
FIG. 2 is a functional block diagram functionally showing a configuration of the head-mount type display device according to the present embodiment.

FIG. 2 is a functional block diagram functionally showing a configuration of the head-mount type display device 100. The control section 10 is provided with an operation section 110 (the touch pad 14, the arrow keys 16, and the power key 18 in the present embodiment), a storage section 120, a power supply 130, a CPU 140, an interface 180, and transmitting sections (Tx) 51, 52, and these components are connected to each other via a bus not shown.

The storage section 120 is a storage section including a ROM, a RAM, a DRAM, a hard disk, and so on. The power supply 130 supplies each constituent of the head-mount type display device 100 with electrical power. As the power supply 130, a secondary battery, for example, can be used.

The CPU 140 executes a program installed in advance to thereby provide a function as an operating system (OS) 150. Further, the CPU 140 develops firmware and a computer program, which are stored in the ROM or the hard disk, in the RAM and then executes them to thereby also function as an image processing section 160, a sound processing section 170, a display control section 190, and a light blocking control section 192.

The interface 180 is an interface for connecting various external equipment OA (e.g., a personal computer (PC), a cellular phone terminal, and a game terminal) to be a supply source of contents to the control section 10. As the interface 180, there can be provided with, for example, a USB interface, an interface for a memory card, and a wireless LAN interface. The contents denote information contents composed of images (still images, moving images), sounds, and so on.

An image processing section 160 generates a clock signal, a vertical sync signal, a horizontal sync signal, and image data based on the content input via the interface 180, and then supplies the image display section 20 with these signals via the connection section 40. Specifically, the image processing section 160 acquires the image signal included in the content. In the case of, for example, a moving image, the image signal thus acquired is an analog signal generally composed of 30 frames of images per second. The image processing section 160 separates sync signals such as the vertical sync signal and the horizontal sync signal from the image signal thus acquired. Further, the image processing section 160 generates the clock signal using a PLL circuit (not shown) or the like in accordance with the period of the vertical sync signal and the horizontal sync signal thus separated.

The image processing section 160 converts the analog signal from which the sync signals are separated into a digital image signal using an A/D converter (not shown). Subsequently, the image processing section 160 stores the digital image signal thus converted into the DRAM in the storage section 120 frame by frame as the image data (RGB data) of a target image. It should be noted that it is also possible for the image processing section 160 to perform image processing such as a resolution conversion process, various color correction processes of, for example, adjustment of luminance and chromaticness, or a keystone correction process on the image data if necessary.

The image processing section 160 transmits the clock signal, the vertical sync signal, and the horizontal sync signal thus generated, and the image data stored in the DRAM in the storage section 120 via the transmitting sections 51, 52. It should be noted that the image data transmitted via the transmitting section 51 is also referred to as "right-eye image data," and the image data transmitted via the transmitting section 52 is also referred to as "left-eye image data." The transmitting sections 51, 52 function as transmitters for serial transmission between the control section 10 and the image display section 20. The image processing section 160 can generate the image in accordance with the processing result of the various applications installed in the OS 150, and then transmit the image thus generated via the transmitting sections 51, 52 as the right-eye image data and the left-eye image data, respectively.

The display control section 190 generates control signals for controlling the right display drive section 22 and the left display drive section 24. Specifically, the display control section 190 controls ON/OFF of driving of a right LCD 241 by a right LCD control section 211, ON/OFF of driving of a right backlight 221 by a right backlight control section 201, ON/OFF of a left LCD 242 by a left LCD control section 212, ON/OFF of driving of a left backlight 222 by a left backlight control section 202, and so on individually using the control signals to thereby control generation and emission of the image light by each of the right display drive section 22 and the left display drive section 24.

The display control section 190 transmits the control signals to the right LCD control section 211 and the left LCD control section 212 via the transmitting sections 51, 52, respectively. Further, the display control section 190 transmits the control signals to the right backlight control section 201 and the left backlight control section 202 via the transmitting sections 51, 52, respectively.

The light blocking control section 192 generates the control signals for controlling a right light blocking section 271 and a left light blocking section 272, and then respectively transmits the control signals thus generated via the connection section 40. Specifically, the light blocking control section 192 controls the drive of the right light blocking section 271 and the drive of the left light blocking section 272 based on the operation data from the operation section 110 or the detection data from the detection section 60 to thereby perform the control of changing the transmittance of the right light blocking section 271 and the left light blocking section 272. Further, the light blocking control section 192 can independently control the transmittance of a first region of each of the right light blocking section 271 and the left light blocking section 272 and the transmittance of the region other than the first region thereof. Further, the light blocking control section 192 can perform control of changing at least one of the size and the position of the first region of each of the right light blocking section 271 and the left light blocking section 272 based on the operation data from the operation section 110 or the detection data from the detection section 60.

The sound processing section 170 acquires (or generates a sound signal in accordance with the processing result of the various applications installed in the OS 150) a sound signal included in the content, amplifies the sound signal thus acquired/generated, and then supplies the result to the right earphone 32 and the left earphone 34 of the image display section 20 via the connection section 40.

The image display section 20 is provided with the right display drive section 22, the left display drive section 24, a right light guide plate 261 and the right light blocking section 271 constituting the right optical image display section 26, a left light guide plate 262 and the left light blocking section 272 constituting the left optical image display section 28, the detection section 60, the right earphone 32, and the left earphone 34.

The right display drive section 22 includes a receiving section (Rx) 53, the right backlight (BL) control section 201 and the right backlight 221 functioning as the light source, the right LCD control section 211 and the right LCD 241 functioning as the display element, and a right projection optical system 251. It should be noted that the right backlight control section 201, the right LCD control section 211, the right backlight 221, and the right LCD 241 are collectively referred to as an "image light generation section."

The receiving section 53 functions as a receiver for serial transmission between the control section 10 and the image display section 20. The right backlight control section 201 has a function of driving the right backlight 221 based on the control signal input thereto. The right backlight 221 is a light emitter such as an LED or electroluminescence (EL). The right LCD control section 211 has a function of driving the right LCD 241 based on the clock signal input via the receiving section 53, the vertical sync signal, the horizontal sync signal, and the right-eye image data. The right LCD 241 is a transmissive liquid crystal panel having a plurality of pixels arranged in a matrix. The image light generation section has a function of modulating the illumination light emitted from the right backlight 221 into the effective image light representing the image by driving the liquid crystal corresponding to each of the pixel positions arranged in a matrix in the right LCD 241 to thereby vary the transmittance of the light transmitted through the right LCD 241. It should be noted that although the backlight system is adopted in the image light generation section in the present embodiment, it is also possible to adopt a configuration of generating the image light using a front light system or a reflective system. The right projection optical system 251 is formed of a collimating lens for converting the image light emitted from the right LCD into a light beam in a parallel state.

The right light guide plate 261 (a virtual image forming section) transmits the external light having been transmitted through the right light blocking section 271, and at the same time guides the image light emitted from the right projection optical system 251 to the right eye RE of the user while reflecting the image light along a predetermined light path. The right light blocking section 271 is formed of a transmissive liquid crystal panel (a liquid crystal shutter) having electrodes arranged so as to be divided region by region or electrodes arranged in a matrix. The right light blocking section 271 is driven by a drive section not shown based on a control signal from the light blocking control section 192, and transmits the external light at the transmittance (arbitrary transmittance in a range of 0 through 100%) controlled by the light blocking control section 192.

The left display drive section 24 includes a receiving section (Rx) 54, the left backlight (BL) control section 202 and the left backlight 222 functioning as the light source, the left LCD control section 212 and the left LCD 242 functioning as the display element, and a left projection optical system 252. It should be noted that the left backlight control section 202, the left LCD control section 212, the left backlight 222, and the left LCD 242 are collectively referred to as an "image light generation section." Further, the left projection optical system 252 and the left light guide plate 262 are collectively referred to as a "light guide section" (an example of the virtual image forming section). The right display drive section 22 and the left display drive section 24 are provided as a pair, and since the components of the left display drive section 24 have substantially the same configurations and functions of the respective components of the right display drive section 22 described above, the detailed explanation thereof will be omitted.

The left light guide plate 262 (the virtual image forming section) transmits the external light having been transmitted through the left light blocking section 272, and at the same time guides the image light emitted from the left projection optical system 252 to the left eye LE of the user while reflecting the image light along a predetermined light path. The left light blocking section 272 has substantially the same configuration as the right light blocking section 271, and is driven by a drive section not shown based on a control signal from the light blocking control section 192, and transmits the external light at the transmittance (transmittance in a range of 0 through 100%) controlled by the light blocking control section 192.

The detection section 60 is for detecting a movement (an impact or a displacement) of the head of the user, and then outputting the detection data to the light blocking control section 192 via the connection section 40. The detection section 60 is formed of at least one inertia sensor such as an acceleration sensor for detecting the acceleration or an angular velocity sensor (a gyro sensor) for detecting the angular velocity. For example, it is possible to configure the detection section 60 only with the acceleration sensor, or it is possible to configure the detection section 60 with the acceleration sensor and the angular velocity sensor combined with each other.

Figure 3:
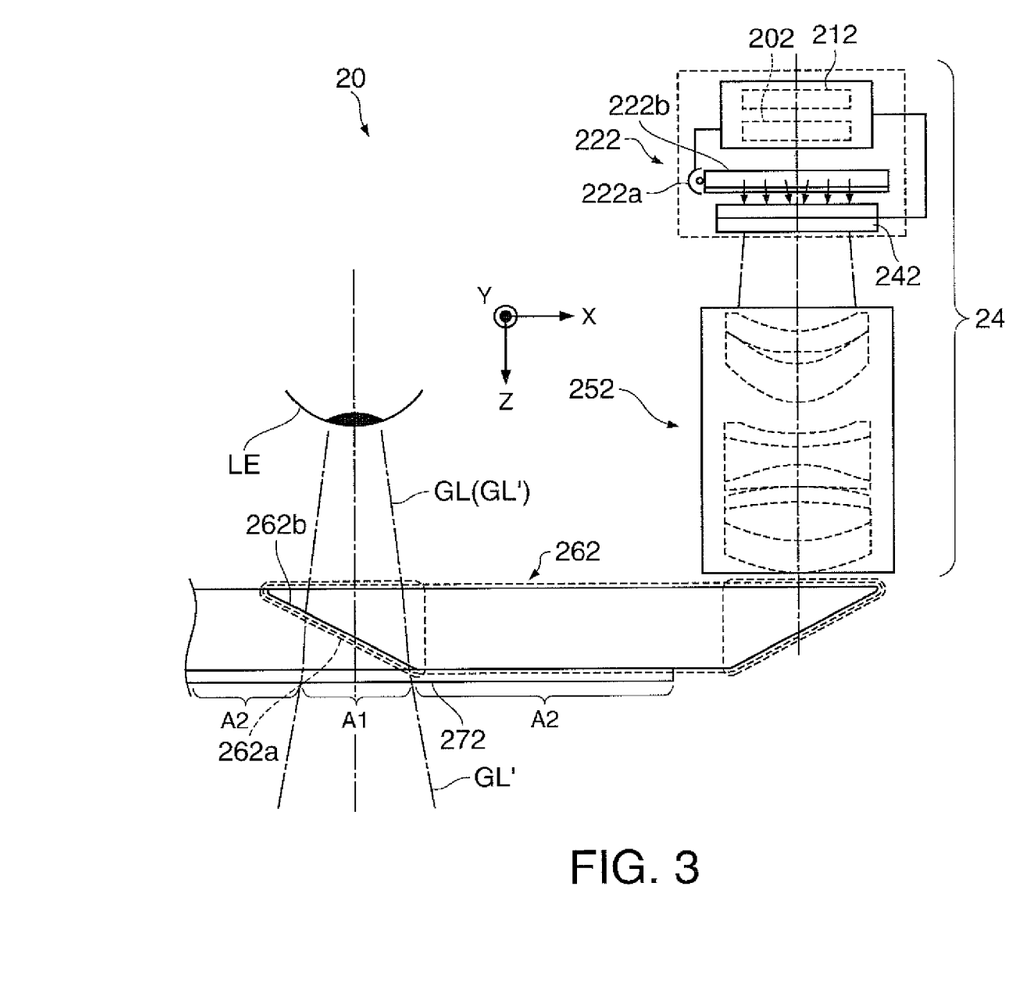
FIG. 3 is a diagram showing a configuration of an optical system of an image display section.

FIG. 3 is a diagram showing a configuration of an optical system of the image display section 20. It should be noted that hereinafter the left optical system of the image display section 20 will be explained, and the detailed explanation of the right optical system having the bilaterally symmetric configuration with the left optical system will be omitted.

The left optical system of the image display section 20 is provided with the left display drive section 24, the left light guide plate 262, and the left light blocking section 272. The left backlight 222 provided to the left display drive section 24 has a light source 222a, and a backlight guide section 222b for dispersing the light from the light source 222a to form a light beam having a rectangular cross-sectional shape. The left LCD 242 spatially modulates the illumination light from the left backlight 222 to form the image light. The left projection optical system 252 is formed of a projection lens group, and projects the image light emitted from the left LCD 242 to form a light beam in a parallel state.

The left light guide plate 262 includes a reflecting section 262a. The reflecting section 262a reflects the image light and at the same time transmits the external light having been transmitted through the first region A1 of the left light blocking section 272 to thereby combine the image light and the external light having been transmitted through the first region A1 with each other. The left light guide plate 262 projects the image light, which is emitted from the left projection optical system 252, on a predetermined surface (a semi-transmissive reflecting surface) 262b of a triangular prism provided to the reflecting section 262a. Here, on the side facing to the left eye LE of the user when mounted out of the both sides of the semi-transmissive reflecting surface 262b provided to the reflecting section 262a, there is formed a half mirror layer. A part of the image light projected on the semi-transmissive reflecting surface 262b provided to the reflecting section 262a is reflected by the semi-transmissive reflecting surface 262b toward the left eye LE of the user, and the reflected light (image light GL) forms a virtual image on the retina of the left eye LE of the user.

The left light blocking section 272 is disposed so as to partially cover the obverse side (the side opposite to the side of the left eye LE of the user) of the left light guide plate 262, and transmits the external light entering the left eye LE of the user in accordance with the transmittance. The first region A1 of the left light blocking section 272 is a region for transmitting the external light to be combined with the image light in the reflecting section 262a, and a second region A2 (the region other than the first region A1) of the left light blocking section 272 is a region for transmitting the external light not to be combined with the image light in the reflecting section 262a.

Among the external light, the external light GL' transmitted through the first region A1 of the left light blocking section 272 is transmitted through the semi-transmissive reflecting surface 262b, and is then guided to the left eye LE of the user. Thus, it results that the user observes what is obtained by superimposing the virtual image formed by the image light GL and the external image formed by the external light GL' transmitted through the first region A1 on each other. On the other hand, the external light transmitted through the second region A2 of the left light blocking section 272 among the external light is not transmitted through the region for reflecting the image light out of the semi-transmissive reflecting surface 262b, but is transmitted through the region other than that region of the left light guide plate 262, and is then partially guided to the left eye LE of the user. Thus, it results that the user observes the external image formed by the external light transmitted through the second region A2 in the periphery of the virtual image formed by the image light GL.

The head-mount type display device 100 according to the present embodiment is configured so as to control the transmittance of the first region A1 of the left light blocking section 272 and the transmittance of the second region A2 thereof independently from each other. In other words, it is possible to perform the control of reducing the external light GL' transmitted through the first region A1 and the external light transmitted through the second region A2 independently from each other. Thus, how easily the external image superimposed on the virtual image is visually recognized (i.e., how easily the virtual image superimposed on the external image is visually recognized) and how easily the external image not superimposed on the virtual image is visually recognized can be controlled independently from each other.

Figure 4A:
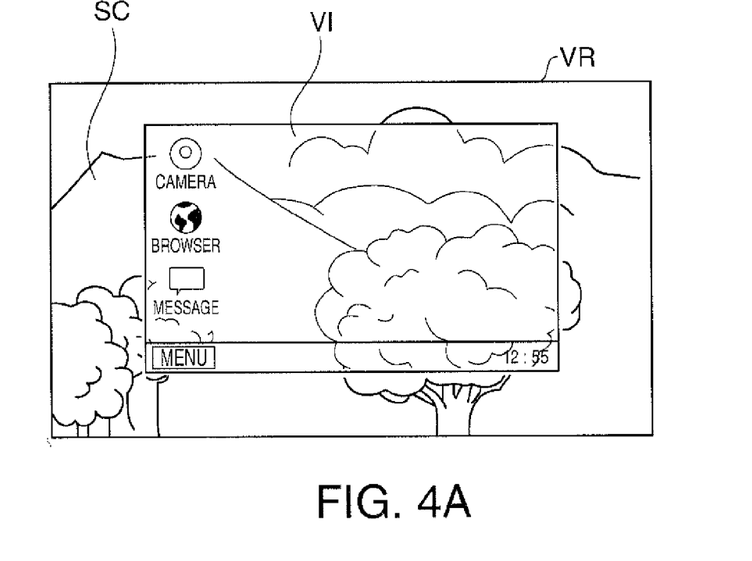
FIGS. 4A and 4B are explanatory diagrams respectively showing an example of a virtual image and an external image to be visually recognized by the user, and an example of setting of the transmittance of a right light-blocking section and a left light-blocking section.
Figure 4B:
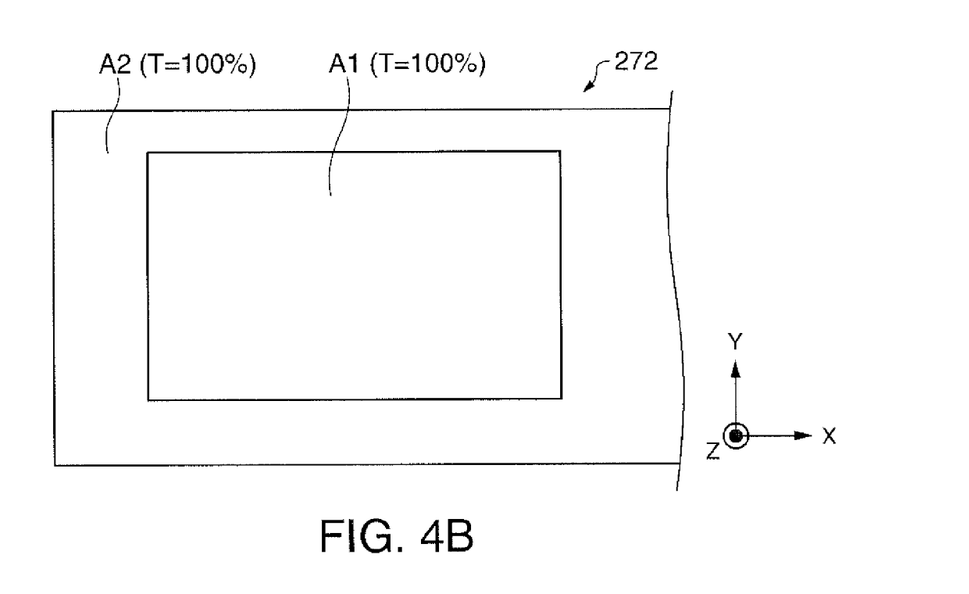

FIG. 4A is an explanatory diagram showing an example of a virtual image and the external image to be visually recognized by the user. Further, FIG. 4B is a diagram showing an example of the setting of the transmittance of the left light blocking section 272 (and the right light blocking section 271). By the image light GL guided to both eyes of the user wearing the head-mount type display device 100 being imaged on the retinas of both eyes of the user in such a manner as described above, the user can visually recognize the virtual image. As shown in FIG. 4A, the virtual image VI is displayed inside the visual field VR of the user of the head-mount type display device 100.

Here, in the case in which the transmittance T of the both regions A1, A2 of the left light blocking section 272 (and the right light blocking section 271) is set (controlled) to 100% as shown in FIG. 4B, the external sight SC (the external image formed by the external light GL' transmitted through the first region A1) is seen through behind the virtual image VI in the part of the visual field VR where the virtual image VI is displayed, and further, the external sight SC (the external image formed by the external light GL' transmitted through the second region A2) is seen in the part other than the part where the virtual image VI is displayed as shown in FIG. 4A. In the case shown in FIG. 4A, since the external sight SC becomes easy to be visually recognized, it is possible for the user to check the surrounding situation, and further to be prevented from getting into visually induced motion sickness even in the case of displaying a fast-moving movie as the virtual image VI.

Figure 5A:
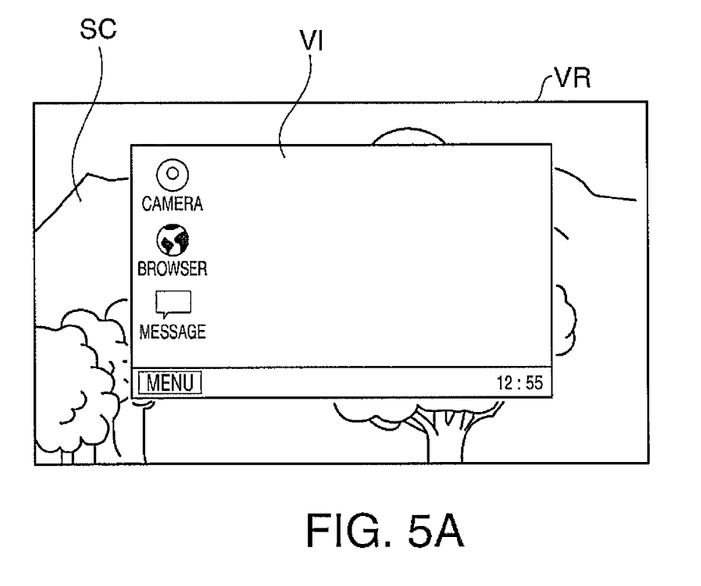
FIGS. 5A and 5B are explanatory diagrams respectively showing an example of the virtual image and the external image to be visually recognized by the user, and an example of setting of the transmittance of the right light-blocking section and the left light-blocking section.
Figure 5B:
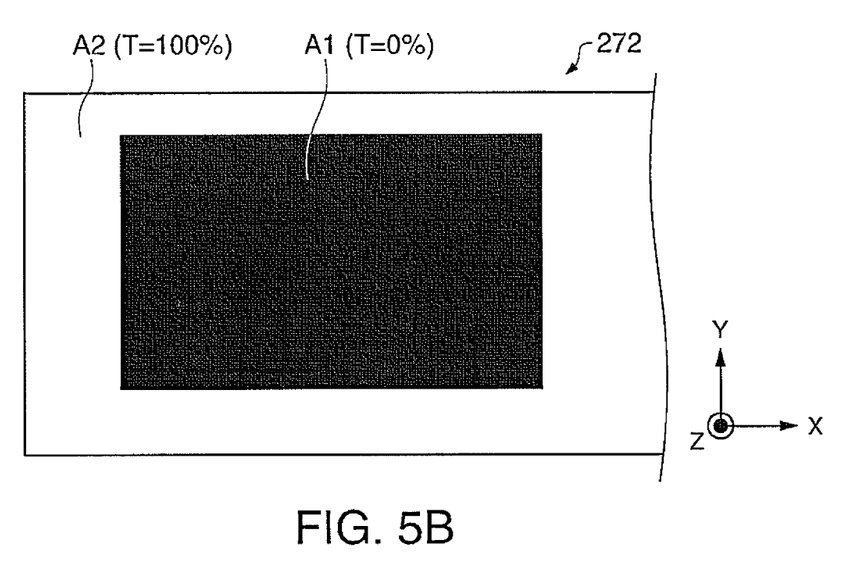

Further, in the case in which the transmittance T of the region A1 of the left light blocking section 272 (and the right light blocking section 271) is set to 0% and the transmittance T of the region A2 is set to 100% as shown in FIG. 5B, since the external light is blocked in the first region A1, the external sight SC is not seen through in the part of the visual field VR where the virtual image VI is displayed, and the external sight SC (the external image formed by the external light GL' transmitted through the second region A2) is seen only in the part other than the part where the virtual image VI is displayed as shown in FIG. 5A. In the case shown in FIG. 5A, it is possible to make the virtual image VI easy to be visually recognized while keeping the visual field with respect to the surroundings.

Figure 6A:
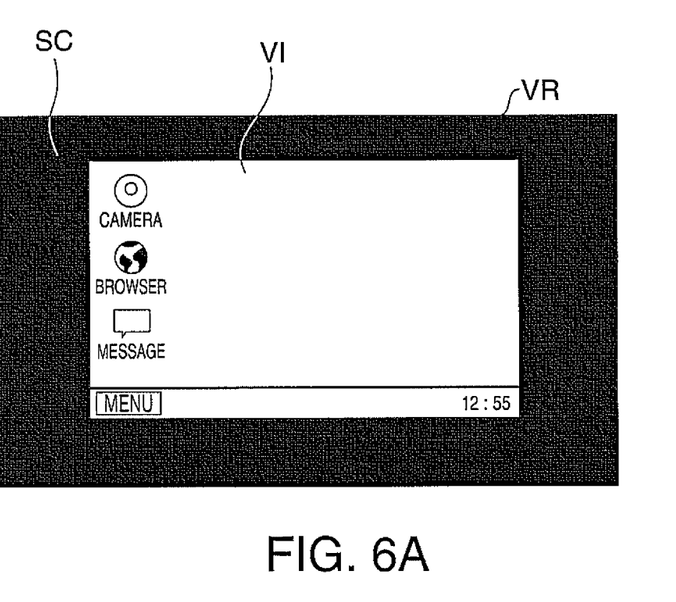
FIGS. 6A and 6B are explanatory diagrams respectively showing an example of the virtual image and the external image to be visually recognized by the user, and an example of setting of the transmittance of the right light-blocking section and the left light-blocking section.
Figure 6B:
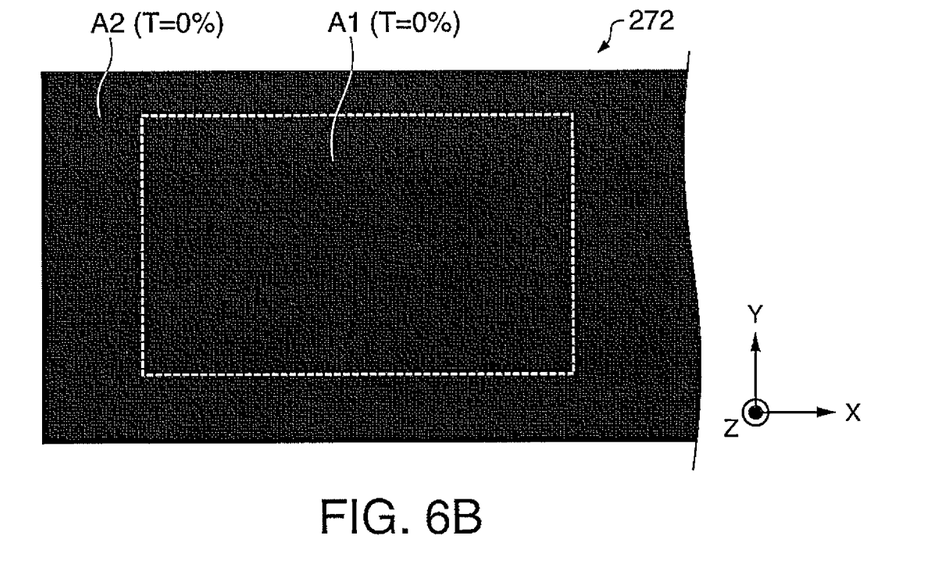

Further, in the case in which the transmittance T of the both regions A1, A2 of the left light blocking section 272 (and the right light blocking section 271) is set to 0% as shown in FIG. 6B, since the external light is blocked in the first region A1 and the second region A2, the external sight SC is not seen through in the part of the visual field VR where the virtual image VI is displayed, and the external sight SC becomes invisible also in the part other than the part where the virtual image VI is displayed as shown in FIG. 6A. In the case shown in FIG. 6A, since only the virtual image VI is displayed in the visual field VR, it is possible to facilitate the user to feel immersive feeling.

In the head-mount type display device 100 according to the present embodiment, by operating the operation section 110, the user can change the transmittance of the left light blocking section 272 and the right light blocking section 271. For example, if the external sight SC seen behind the virtual image VI acts as an obstacle, it is possible to make the virtual image VI eye-friendly by performing the operation of setting the transmittance of the left light blocking section 272 and the right light blocking section 271 as shown in FIG. 5B or FIG. 6B, and further, if it is required to check the surrounding situation or if watching a fast-moving movie, it is possible to make the external sight SC eye-friendly by performing the operation of setting the transmittance of the left light blocking section 272 and the right light blocking section 271 as shown in FIG. 4B or FIG. 5B.

Further, it is also possible for the light blocking control section 192 to perform the control of changing the transmittance of the left light blocking section 272 and the right light blocking section 271 in accordance with the type of the application started up in response to the user operating the operation section 110. For example, if an application (e.g., an application for playing videos) for displaying a content as a virtual image VI in which the external sight SC seen behind does not act as a serious obstacle is started up, the light blocking control section 192 performs the control of setting the transmittance of the left light blocking section 272 and the right light blocking section 271 as shown in FIG. 4B. Further, if an application (e.g., an application for displaying a still image and a text, and an application of performing an operation on a display object) for displaying a content as a virtual image VI in which the external sight SC seen behind acts as an obstacle is started up, the light blocking control section 192 performs the control of setting the transmittance of the left light blocking section 272 and the right light blocking section 271 as shown in FIG. 5B or FIG. 6B.

Further, the light blocking control section 192 can also perform the control of changing the transmittance of the left light blocking section 272 and the right light blocking section 271 based on the detection data from the detection section 60. For example, if the light blocking control section 192 determines that the head of the user has moved (or the head has turned) based on the detection data from the detection section 60, since it is conceivable that the user responds to an external stimulus other than the virtual image VI (e.g., the user is addressed by someone), in such a case, the light blocking control section 192 performs the control of setting the transmittance of the left light blocking section 272 and the right light blocking section 271 as shown in FIG. 4B or FIG. 5B to thereby make the external sight SC eye-friendly.

Further, if some operation to the operation section 110 is performed, since it is conceivable that the user is concentrated in the virtual image VI, in such a case, it is possible for the light blocking control section 192 to perform the control of setting the transmittance of the left light blocking section 272 and the right light blocking section 271 as shown in FIG. 5B or FIG. 6B to thereby make the virtual image VI eye-friendly.

The invention is not limited to the embodiment described above, but can variously be modified. For example, the invention includes configurations (e.g., configurations having the same function, the same way, and the same result, or configurations having the same object and the same advantage) substantially the same as the configuration described as the embodiment. Further, the invention includes configurations obtained by replacing a non-essential part of the configuration described as the embodiment. Further, the invention includes configurations providing the same functions and the same advantages or configurations capable of achieving the same object as the configuration described as the embodiment. Further, the invention includes configurations obtained by adding technologies known to the public to the configuration described as the embodiment.

For example, although in the embodiment described above, the case in which the control section 10 and the image display section 20 are configured as separate bodies is explained, it is also possible to configure the head-mount type display device 100 with the control section 10 and the image display section 20 integrated with each other.

Further, although in the embodiment described above, the case of using the transmissive liquid crystal panel (the liquid crystal shutter) as the light blocking section (the right light blocking section 271, the left light blocking section 272) is explained, the invention is not limited thereto. Any device can be used as the light blocking section providing the device can block the light using a mechanical configuration or an optical configuration. For example, the light blocking section can be formed of an electrochromic element.

Further, although in the embodiment described above, the case in which the first region A1 of the light blocking section is formed to be the region of transmitting the external light to be combined with the image light in the reflecting section 262a, and the second region A2 (the region other than the first region A1) of the light blocking section is formed to be the region of transmitting the external light not to be combined with the image light in the reflecting section 262a is explained, the invention is not limited thereto, but it is also possible that the first region A1 of the light blocking section is formed to be a region with an arbitrary size and an arbitrary position. For example, it is also possible that the first region A1 of the light blocking section is formed to be a region of transmitting at least a part of the external light to be combined with the image light in the reflecting section 262a. Further, it is possible to configure the light blocking section so that at least one of the size and the position of the first region A1 and the second region A2 is variable.

Figure 7A:
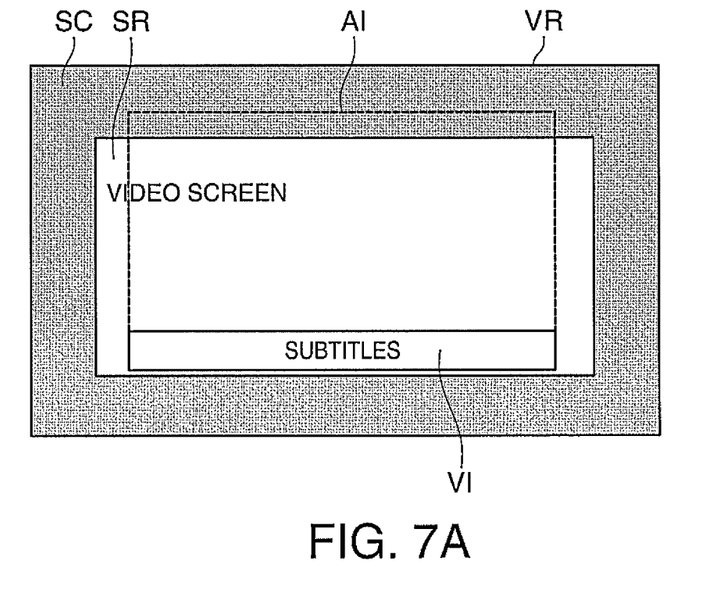
FIGS. 7A and 7B are diagrams for explaining a modified example.
Figure 7B:
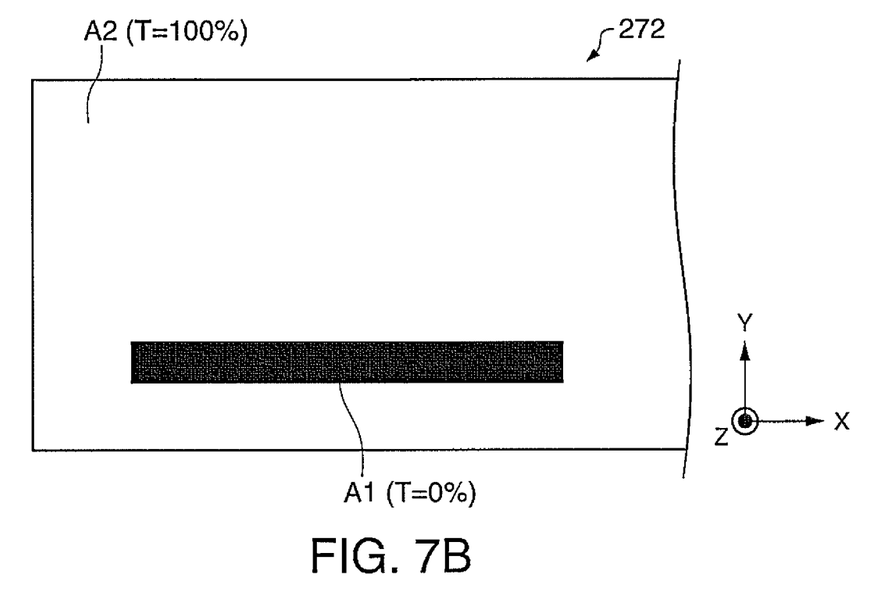
Figure 8A:
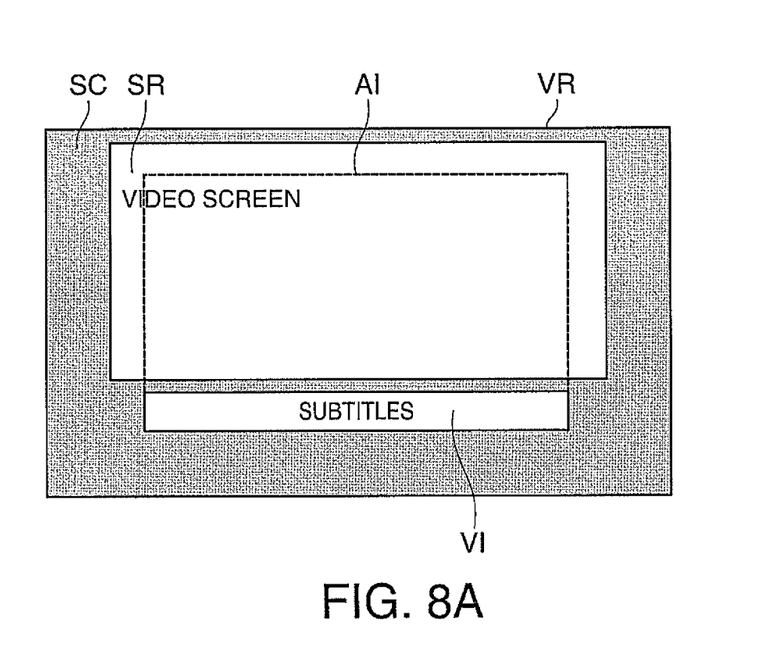
FIGS. 8A and 8B are diagrams for explaining a modified example.
Figure 8B:
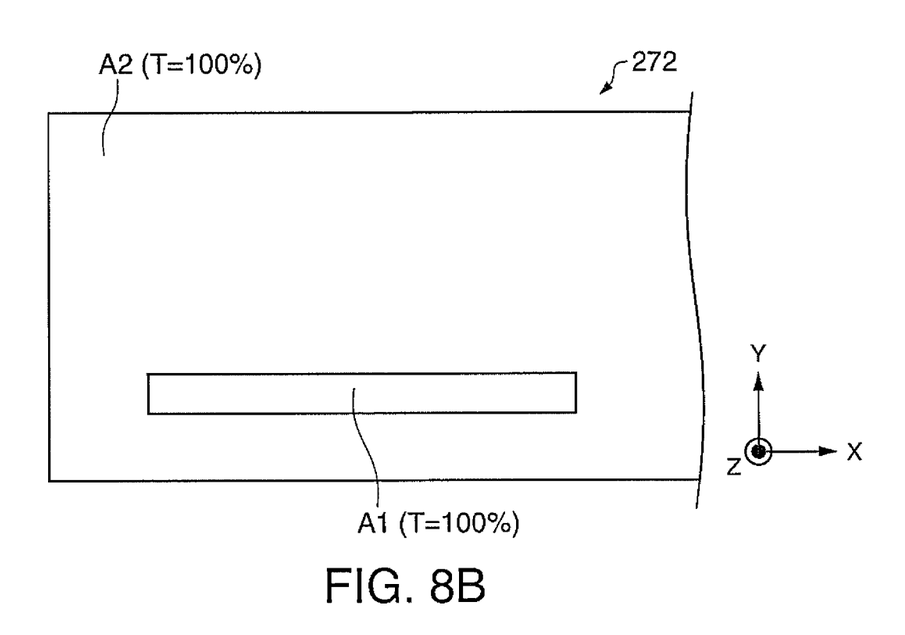

For example, if the head-mount type display device 100 according to the embodiment of the invention is used as a device for displaying subtitles for the purpose of watching movies in a movie theater, the subtitles are displayed as the virtual image VI in the lower part of a virtual image display area AI (an area where the virtual image can be displayed) of the visual field VR of the user as shown in FIG. 7A. The user can see the subtitles as the virtual image VI while watching a video screen SR as the external image SC. On this occasion, as shown in FIG. 7B, by setting the first region A1 of the left light blocking section 272 (and the right light blocking section 271) in accordance with the area where the subtitles are displayed as the virtual image VI in the virtual image display area AI, setting the transmittance T of the first region A1 to 0% (or % T≤100%), and setting the transmittance T of the second region A2 (the region other than the first region A1) to 100%, it is possible to make the most part of the video screen SR as the external image SC to be visually recognized while facilitating the subtitles (the virtual image VI) superimposed on the video screen SR to be visually recognized. Further, it is possible to perform the control of decreasing the transmittance T of the first region A1 as shown in FIG. 7B if there is a positional relationship in which the video screen SR to be visually recognized as the external image SC and the subtitles (the virtual image VI) overlap each other as shown in FIG. 7A, and setting the transmittance T of the first region A1 to 100% (or setting the size of the first region A1 to 0) as shown in FIG. 8B if there is a positional relationship in which the video screen SR to be visually recognized as the external image SC and the subtitles (the virtual image VI) do not overlap each other as shown in FIG. 8A. For example, it is possible that the image display section 20 is provided with an imaging section (a camera) for taking an image of the sight in the visual field direction of the user, and the light blocking control section 192 determines whether or not the subtitles (the virtual image VI) and the video screen SR overlap each other in the visual field VR of the user based on the position (and the area) of the video screen SR in the taken image output from the imaging section. Further, it is possible to determine the positional relationship described above based on the detection data from the detection section 60.

Figure 9:
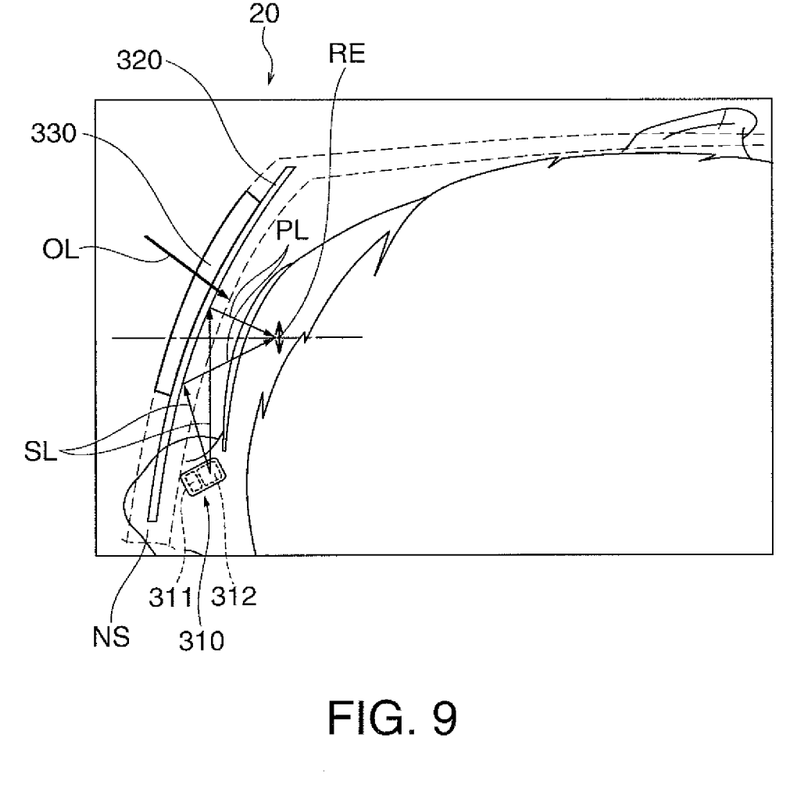
FIG. 9 is a diagram for explaining a modified example.

Further, although in the embodiment described above, there is explained the case in which the image light generation section is formed of the liquid crystal panel and the backlight, and it is arranged that the image light thus generated is guided to the eyes of the user using the light guide plate, the invention is not limited thereto. For example, as shown in FIG. 9, the image display section 20 can be composed of a light emitting section 310 for forming the signal light and at the same time emitting the signal light as scanning light SL, a virtual image forming section 320 as an irradiation target member for receiving the scanning light SL to form the image light PL, and a light blocking section 330. As shown in FIG. 9, the light emitting section 310 is disposed around the nose NS of the user, and the virtual image forming section 320 is disposed so as to cover the front of the eye RE of the user. Further, the light blocking section 330 is disposed so as to cover a part of the obverse side of the virtual image forming section 320. The light emitting section 310 has a signal light modulation section 311 for forming the signal light modulated in accordance with the image, a scanning optical system 312 for two-dimensionally scanning the signal light as the scanning light SL in the virtual image forming section 320, and a drive control circuit not shown. The signal light modulation section 311 is formed of three light sources for generating respective colored lights of, for example, red, blue, and yellow colors, and a dichroic mirror for combining the colored lights to form the signal light, and the scanning optical system 312 is formed of, for example, a MEMS mirror. The virtual image forming section 320 is a half mirror configured including the semi-transmissive reflecting film disposed on a transparent substrate, and receives the scanning light SL emitted from the scanning optical system 312, then reflecting the scanning light SL to thereby form the virtual image, and then makes the user visually recognize the virtual image. The virtual image forming section 320 is configured so as not only to form the virtual image, but also to transmit the external light OL having been transmitted through the light blocking section 330 to thereby allow the user to visually recognize the virtual image and the external image at the same time.

Further, it is possible to configure the image light generation section (the image display section 20) with a prism (a light guide prism) including three or more axi-asymmetric curved surfaces and a projection lens for making the image light enter the prism, and to configure the optical system including the projection lens as a relay optical system for forming an intermediate image inside the prism. Further, it is possible to adopt the configuration in which the image light is reflected by a third surface, a first surface, and a second surface of the prism in this order, and then reaches the user after transmitted through the first surface, and the external light is transmitted through the first surface and the third surface of the prism, and then reaches the user.

Further, it is possible to adopt the configuration in which a reflective volume hologram is provided to each of the light incidence section through which the image light is input to the light guide section and the light exit section through which the image light guided by the light guide section is emitted to the outside to thereby cause diffraction reflection of the image light.

The entire disclosure of Japanese Patent Application No. 2012-083634, filed Apr. 2, 2012 is expressly incorporated by reference herein.

What is claimed is:

1. A head-mount type display device adapted to allow a user to visually recognize a virtual image in a state of being worn on the head of the user, comprising:
   an image display section having an image light generation section adapted to generate an image light representing an image, a light blocking section adapted to transmit external light at a predetermined transmittance, and a virtual image forming section adapted to transmit the external light transmitted through the light blocking section and to form the virtual image in an eye of the user with the image light, and configured to allow the user to visually recognize the virtual image and an external image;
   an operation section with which the user inputs operation data; and
   a control section adapted to perform control of changing the transmittance of the light blocking section.

2. The head-mount type display device according to claim 1, wherein
   the control section controls the transmittance of the light blocking section based on an operation of the operation section.

3. The head-mount type display device according to claim 1, wherein
   the control section controls the transmittance of a first region of the light blocking section and the transmittance of a region other than the first region independently from each other.

4. The head-mount type display device according to claim 3, wherein
   the control section performs control of changing at least one of a size and a position of the first region.

5. The head-mount type display device according to claim 3, wherein
   the control section controls the transmittance of the first region of the light blocking section and the transmittance of the region other than the first region independently from each other in accordance with one of a size of subtitles and a position of the subtitles.

6. The head-mount type display device according to claim 3, wherein
   the control section controls the transmittance of the first region of the light blocking section and the transmittance of the region other than the first region independently from each other in accordance with one of a type of a moving image and a type of an application.

7. The head-mount type display device according to claim 3, wherein
   the control section controls the transmittance of the first region of the light blocking section and the transmittance of the region other than the first region independently from each other in accordance with a positional relationship regarding whether or not a video screen recognized as the external image and subtitles overlap each other.

8. The head-mount type display device according to claim 3, wherein
   the control section controls the transmittance of the first region of the light blocking section and the transmittance of the region other than the first region so as to make the external image eye-friendly in a case of watching a fast-moving movie.

9. A head-mount type display device adapted to allow a user to visually recognize a virtual image in a state of being worn on the head of the user, comprising:
   an image display section having an image light generation section adapted to generate an image light representing an image, a light blocking section adapted to transmit external light at a predetermined transmittance, and a virtual image forming section adapted to transmit the external light transmitted through the light blocking section and to form the virtual image in an eye of the user with the image light, and configured to allow the user to visually recognize the virtual image and an external image;
   a detection section provided to the image display section, and adapted to detect a movement of the head of the user; and
   a control section adapted to perform control of changing the transmittance of the light blocking section in accordance with detection data detected by the detection section.

10. The head-mount type display device according to claim 9, wherein
    the control section controls the transmittance of a first region of the light blocking section and the transmittance of a region other than the first region independently from each other.

11. The head-mount type display device according to claim 10, wherein
    the control section performs control of changing at least one of a size and a position of the first region.

12. The head-mount type display device according to claim 10, wherein
    the control section controls the transmittance of the first region of the light blocking section and the transmittance of the region other than the first region independently from each other in accordance with one of a size of subtitles and a position of the subtitles.

13. The head-mount type display device according to claim 10, wherein
    the control section controls the transmittance of the first region of the light blocking section and the transmittance of the region other than the first region independently from each other in accordance with one of a type of a moving image and a type of an application.

14. The head-mount type display device according to claim 10, wherein
    the control section controls the transmittance of the first region of the light blocking section and the transmittance of the region other than the first region independently from each other in accordance with a positional relationship regarding whether or not a video screen recognized as the external image and subtitles overlap each other.

15. The head-mount type display device according to claim 10, wherein the control section controls the transmittance of the first region of the light blocking section and the transmittance of the region other than the first region so as to make the external image eye-friendly in a case of watching a fast-moving movie.

\* \* \* \* \*